(12) United States Patent
Shimizu et al.

(10) Patent No.: US 8,479,376 B2
(45) Date of Patent: Jul. 9, 2013

(54) PRODUCTION METHOD FOR A MAGNETOSTRICTIVE TORQUE SENSOR

(75) Inventors: Yasuo Shimizu, Saitama (JP); Nagatsugu Mukaibou, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 400 days.

(21) Appl. No.: 12/721,121

(22) Filed: Mar. 10, 2010

(65) Prior Publication Data
US 2010/0170742 A1   Jul. 8, 2010

Related U.S. Application Data

(62) Division of application No. 12/007,372, filed on Jan. 9, 2008, now Pat. No. 7,730,602.

(30) Foreign Application Priority Data

Jan. 9, 2007   (JP) .................................. 2007-000918

(51) Int. Cl.
*G01R 3/00*   (2006.01)

(52) U.S. Cl.
USPC ................ 29/595; 29/592.1; 29/831; 29/846; 73/862.331

(58) Field of Classification Search
USPC ............ 29/592.1, 595, 831, 846; 73/862.331; 361/283, 301
See application file for complete search history.

(56) References Cited

U.S. PATENT DOCUMENTS

| | | | |
|---|---|---|---|
| 6,084,140 A * | 7/2000 | Kitamura et al. | 585/260 |
| 6,574,853 B2 | 6/2003 | Shinoura | |
| 7,310,870 B2 | 12/2007 | Shimizu et al. | |
| 7,562,432 B2 * | 7/2009 | Harata et al. | 29/593 |
| 7,568,274 B2 * | 8/2009 | Yoneda et al. | 29/458 |
| 2007/0068726 A1 | 3/2007 | Shimizu | |

FOREIGN PATENT DOCUMENTS

| | | |
|---|---|---|
| JP | 56-044794 A | 4/1981 |
| JP | 2002-082000 A | 3/2002 |
| JP | 2002-250662 A | 9/2002 |
| JP | 3377519 B2 | 12/2002 |
| JP | 2004-333449 A | 11/2004 |
| JP | 2006-322952 A | 11/2006 |

* cited by examiner

*Primary Examiner* — Paul D Kim
(74) *Attorney, Agent, or Firm* — Arent Fox LLP

(57) ABSTRACT

A method produces a magnetostrictive torque sensor which detects a steering torque applied to a steering shaft by electrically detecting distortion of magnetostrictive films provided on a surface of the steering shaft. A plating step forms the magnetostrictive film on the surface of the steering shaft, and a heat treatment step heat treats the magnetostrictive film on the steering shaft. During the heat treatment step, hydrogen in the magnetostrictive film is decreased so that a hydrogen desorbing peak around 120° C. disappears when the magnetostrictive film is heated after the heat treatment step.

3 Claims, 12 Drawing Sheets

INITIALLY

AFTER BEING LEFT AT USE AMBIENT TEMPERATURE

MODE 1

MODE 2

PRODUCTION METHOD FOR A MAGNETOSTRICTIVE TORQUE SENSOR

CROSS-REFERENCE TO RELATED APPLICATIONS

This application is a Divisional of U.S. patent application Ser. No. 12/007,372, filed Jan. 9, 2008, now U.S. Pat. No. 7,730,602, which claims priority from Japanese Patent Application No. 2007-000918 filed on Jan. 9, 2007. The disclosures of the prior applications are hereby incorporated by reference herein in their entirety.

BACKGROUND OF THE INVENTION

1. Field of the Invention

The present invention relates to a magnetostrictive torque sensor which electrically detects a distortion of a magnetostrictive film provided on a surface of a steering shaft, thereby detecting steering torque applied to the steering shaft, and a production method and an evaluation method for the same.

2. Description of the Related Art

Magnetostrictive torque sensors are used in electric power steering systems for vehicles, and the electric power steering system is a support system which, when a driver turns the steering wheel while driving the vehicle, has a motor cooperate therewith so as to assist the steering effort. In the electric power steering system, the magnetostrictive torque sensor detects the steering torque caused in the steering shaft coupled to the steering wheel by the driver turning the steering wheel. The electric power steering system controls the auxiliary steering force that is the output from the motor based on the detected steering torque and a vehicle speed signal from a vehicle speed sensor, which detects the speed of the vehicle, thereby reducing the steering effort of the driver.

A magnetostrictive torque sensor has been proposed where two magnetostrictive films of Ni—Fe alloy are provided one above the other on the surface of the steering shaft so as to have opposite directions of magnetic anisotropy (refer to, e.g., Japanese Patent Application Laid-Open Publication No. 2004-333449). When the steering torque acts on the steering shaft, the steering shaft is twisted, thus distorting the magnetostrictive films, and the alternating-current resistance and the like of coils provided around the magnetostrictive films vary according to an inverse magnetostriction characteristic due to magnetic anisotropy. The magnetostrictive torque sensor detects this change, thereby detecting the steering torque acting on the steering shaft.

As to, e.g., vehicles, forklifts, and the like, ambient temperature of use may be high. Due to, for example, heat from the engine such as a combustion engine or a motor, heat from a factory, and further heat from direct sunlight, ambient temperature of use reaches 80 to 110° C. In, particularly, vehicles used at such use ambient temperature, the auxiliary steering force may differ in magnitude between when turning the steering wheel rightward and when turning it leftward. In particular, after a vehicle is left for a long time at use ambient temperature, when turning the steering wheel while being in a stopped state, i.e., when performing so-called stationary steering, the driver may realize that the auxiliary steering force differs in magnitude between the rightward turning and leftward turning of the steering wheel. The cause for this is thought to be that the magnitude of the steering torque signal detected by the magnetostrictive torque sensor shifts at use ambient temperature to be different between the rightward turning and leftward turning of the steering wheel.

SUMMARY OF THE INVENTION

Preferably there is provided a magnetostrictive torque sensor where, even at use ambient temperature, the shift in the magnitude of the detected steering torque signal is reduced and where the magnitude of the detected steering torque signal is the same for the rightward turning and the leftward turning with the same steering effort, and a production method for the magnetostrictive torque sensor.

A first aspect provides a magnetostrictive torque sensor comprising: a steering shaft; and a magnetostrictive film provided on a surface of the steering shaft of which distortion is to be electrically detected in order to detect steering torque applied to a steering shaft, wherein after the magnetostrictive film is removed from the surface of the steering shaft, when a thickness of the magnetostrictive film is at 40 µm, and thermal desorption gas analysis is performed thereon in which the magnetostrictive film is heated at a temperature rise rate of 5° C. per minute, wherein after the thermal desorption gas analysis the magnetostrictive film contains hydrogen so as to satisfy at least one of the following first to third conditions: the first condition that a ratio of the weight of hydrogen desorbed by the heating from the magnetostrictive film by the time the magnetostrictive film reaches 150° C. to the weight of the magnetostrictive film before the heating is at or below 3 ppm; the second condition that the ratio of the weight of hydrogen desorbed by the time the magnetostrictive film reaches 300° C. to the weight of the magnetostrictive film before the heating is at or below 10 ppm; and the third condition that the ratio of the weight of hydrogen desorbed by the time the magnetostrictive film reaches 400° C. to the weight of the magnetostrictive film before the heating is at or below 15 ppm.

According to the first aspect, although hydrogen is mixed in the magnetostrictive film when formed, because the hydrogen content is reduced, no more hydrogen outgases from the magnetostrictive film at use ambient temperature, thus reducing the shift in the magnitude of the steering torque signal detected by the magnetostrictive torque sensor. Hence, if adjustment is made such that the magnitude of the detected steering torque signal is the same between when turning the steering wheel rightward and when turning it leftward before the vehicle is used, even at use ambient temperature while the vehicle is being used, the magnitude of the detected steering torque signal can be the same with the same steering effort between when turning the steering wheel rightward and when turning it leftward. Thus, a driver can steer the vehicle comfortably without feeling unease.

A second aspect provides a production method for a magnetostrictive torque sensor which detects steering torque applied to a steering shaft by electrically detecting distortion of a magnetostrictive film provided on a surface of the steering shaft, comprising: a plating step of forming the magnetostrictive film on the surface of the steering shaft; and a heat treatment step of heat-treating the magnetostrictive film; removing the magnetostrictive film after the heat treatment step from the surface of the steering shaft; performing a thermal desorption gas analysis thereon is performed in which the magnetostrictive film is heated at a temperature rise rate of 5° C. per minute, when a thickness of the magnetostrictive film is 40 µm, wherein hydrogen in the magnetostrictive film is reduced in amount by the heat treatment step so as to satisfy at least one of the following conditions: a condition that a ratio of the weight of hydrogen desorbed by the heating from the magnetostrictive film by the time the magnetostrictive film reaches 150° C. to the weight of the magnetostrictive film before the heating is at or below 3 ppm; a condition that the ratio of the weight of hydrogen desorbed by the time the magnetostrictive film reaches 300° C. to the weight of the magnetostrictive film before the heating is at or below 10 ppm; and a condition that the ratio of the weight of hydrogen desorbed by the time the magnetostrictive film reaches 400° C. to the weight of the magnetostrictive film before the heating is at or below 15 ppm.

According to the second aspect, although hydrogen is mixed into the magnetostrictive film in the plating step, because the heat treatment step can reduce the content of hydrogen, no more hydrogen is desorbed from the magnetostrictive film at use ambient temperature, and hence the magnitude of the steering torque signal detected by the magnetostrictive torque sensor does not shift.

A third aspect provides a production method based on the second aspect, further comprising: a condition setting step of setting a heat treatment temperature of the magnetostrictive film in the heat treatment step and heat treatment time for which to maintain the heat treatment temperature, wherein in the condition setting step, the heat treatment time required to reduce the amount of hydrogen in the magnetostrictive film so as to satisfy the at least one condition can be set according to the heat treatment temperature, or the heat treatment temperature required to reduce the amount of hydrogen in the magnetostrictive film so as to satisfy the at least one condition can be set according to the heat treatment time.

Therefore, the heat treatment temperature and the heat treatment time of the heat treatment step can be set according to the type of heat-treating apparatus. For example, if a low-temperature thermostatic bath of which the heat treatment temperature cannot be set at a high temperature is used as the heat-treating apparatus, the heat treatment time may be set according to the low heat treatment temperature of the thermostatic bath. If a hardening or annealing apparatus of which the heat treatment temperature is set at a high temperature is used as the heat-treating apparatus, the heat treatment time may be set according to the high heat treatment temperature. As such, degrees of freedom in selecting as the heat-treating apparatus can be increased in number.

The heat treatment step preferably comprises a plurality of heat treatments different in the heat treatment temperature or heat treatments the times of which the heat treatment time is divided into. With such a multiple stage heat treatment, the amount of hydrogen can be reduced at each stage. Hence, the heat treatment whose primary objective is not to reduce the amount of hydrogen can also be used as a stage of a heat treatment for reducing the amount of hydrogen.

In the heat treatment step, in order to give magnetic anisotropy to the magnetostrictive film, while torque is being applied to the steering shaft, preferably the magnetostrictive film provided on the surface of the steering shaft is heated. The amount of hydrogen can be reduced with giving magnetic anisotropy to the magnetostrictive film.

In the heat treatment step, the magnetostrictive film is preferably heat treated by high frequency heating. Since the high frequency heating can heat the outer layer of an object, only the magnetostrictive film can be heated without heating the steering shaft because the magnetostrictive film is provided on the surface of the steering shaft.

A fourth aspect of the present invention provides evaluation method for a magnetostrictive torque sensor which detects steering torque applied to a steering shaft by electrically detecting distortion of a magnetostrictive film provided on a surface of the steering shaft, comprising: removing the magnetostrictive film from the surface of the steering shaft; performing a thermal desorption gas analysis thereon in which the magnetostrictive film is heated at a temperature rise rate of 5° C. per minute; evaluating variation over time in a magnetic characteristic of the magnetostrictive film when a thickness of the magnetostrictive film is 40 µm, by determining whether at least one of the following conditions has been satisfied: a condition that a ratio of the weight of hydrogen desorbed by the heating from the magnetostrictive film by the time the magnetostrictive film reaches 150° C. to the weight of the magnetostrictive film before the heating is at or below 3 ppm; a condition that the ratio of the weight of hydrogen desorbed by the time the magnetostrictive film reaches 300° C. to the weight of the magnetostrictive film before the heating is at or below 10 ppm; and a condition that the ratio of the weight of hydrogen desorbed by the time the magnetostrictive film reaches 400° C. to the weight of the magnetostrictive film before the heating is at or below 15 ppm.

According to the fourth aspect, because variation over time in a magnetic characteristic of the magnetostrictive film depends on the weight of hydrogen that can be desorbed, in the thermal desorption gas analysis, by measuring the weight of hydrogen desorbed, the magnetic characteristic of the magnetostrictive film can be predicted. Based on this prediction, variation over time in the magnetic characteristic of the magnetostrictive film can be evaluated through the above determination. Therefore, the magnetostrictive film with smaller variation over years in the magnetic characteristic can be provided.

BRIEF DESCRIPTION OF THE DRAWINGS

For a more complete understanding of the present invention and the advantages thereof, reference is now made to the following description taken in conjunction with the accompanying drawings wherein.

DETAILED DESCRIPTION OF THE INVENTION

Figure 1:
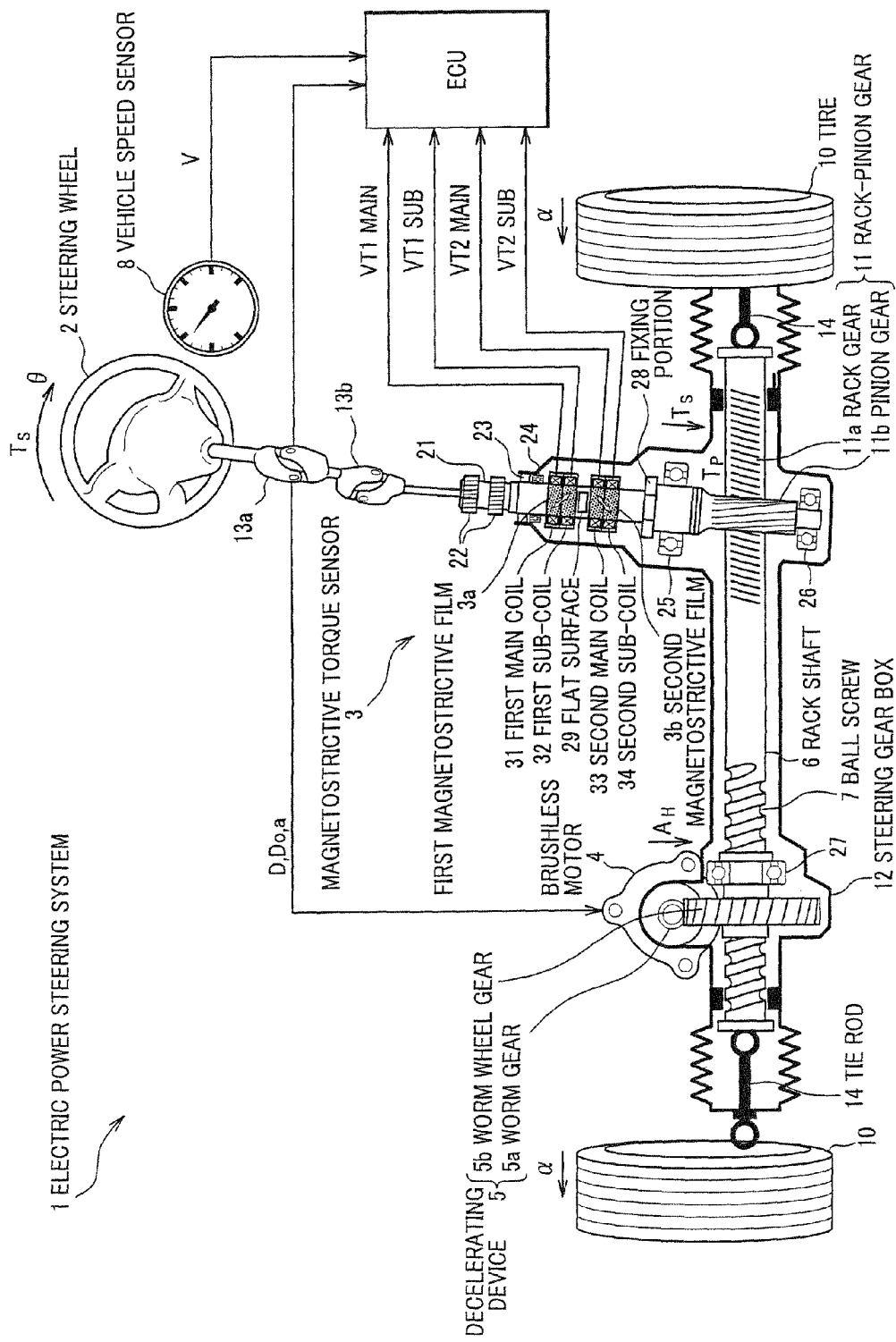
FIG. 1 is an illustration showing an electric power steering system having a magnetostrictive torque sensor according to an embodiment of the present invention.

An embodiment of the present invention will be described in detail below with reference to the drawings as needed. In the figures, the same reference numerals indicate common parts with duplicate description thereof being omitted.

FIG. 1 is a diagram of the entire configuration of an electric power steering system (EPS) 1 according to an embodiment of the present invention. A steering wheel 2 is coupled to the upper end of a steering shaft 21 via universal joints 13a, 13b. A pinion gear 11b is secured to the lower end of the steering shaft 21. The pinion gear 11b engages a rack gear 11a, and the rack gear 11a and the pinion gear 11b form a rack-pinion gear 11. The rack-pinion gear 11 converts steering torque Ts of the steering shaft 21 into thrust of an axis direction of a rack shaft 6. The rack gear 11a is made by cutting into the rack shaft 6.

A ball screw 7 is also made by cutting into the rack shaft 6, and a ball nut is provided on the inner side of a worm wheel gear 5b. The ball screw 7 engages the ball nut via a plurality of balls. The outer teeth of the worm wheel gear 5b engage a worm gear 5a. The worm gear 5a is coupled to the rotation shaft of a brushless motor 4. The brushless motor 4 assists the driver to steer with power. The worm gear 5a and the worm wheel gear 5b form a decelerating device 5. The decelerating device 5 doubles auxiliary torque AH that the brushless motor 4 generates. The ball screw 7 converts the doubled auxiliary torque AH into thrust in the axis direction of the rack shaft 6. One ends of tie rods 14 are fixed to opposite ends of the rack shaft 6, and a tire 10 as a front wheel is attached to the other end of each tie rod 14.

The rack shaft 6 is supported at its one end by a bearing 27 via the ball screw 7 and at the other end by a rack guide (not shown) and is held in a steering gear box 12 so as to be able to freely move in the axis direction without rotating. The steering shaft 21 is rotatably held in the steering gear box 12 by bearings 24, 25, 26.

A tightener 22 is provided on the steering shaft 21 to couple the universal joint 13b and the steering shaft 21. Further, on the steering shaft 21, a seal 23 is provided to seal the steering shaft 21 to the steering gear box 12, and also a flat surface 29 and a fixing portion 28 are provided.

A magnetostrictive torque sensor 3 is provided on the steering shaft 21. The magnetostrictive torque sensor 3 detects steering torque Ts input by a driver through the steering wheel 2. The magnetostrictive torque sensor 3 has annular first and second magnetostrictive films 3a, 3b formed around the steering shaft 21. An Fe—Ni-based or Fe—Cr-based magnetostrictive material is suitable for the first and second magnetostrictive films 3a, 3b. The first and second magnetostrictive films 3a, 3b are formed by plating, vapor deposition, or the like on the steering shaft 21 or the like, for example, on the surface of the steering shaft 21 or a hollow pipe into which the steering shaft 21 is force fitted. The first and second magnetostrictive films 3a, 3b may be integrated with the steering shaft 21, or may be formed beforehand and bonded to the steering shaft 21 by an adhesive.

Further, the magnetostrictive torque sensor 3 has a first main coil 31 and a first sub-coil 32 around the first magnetostrictive film 3a and also a second main coil 33 and a second sub-coil 34 around the second magnetostrictive film 3b.

The steering torque Ts is generated by the driver turning the steering wheel 2 and transmitted to the steering shaft 21. The transmitted steering torque Ts is detected by the magnetostrictive torque sensor 3, and a VT1 main signal (VT1 main) as a detection signal is output from the first main coil 31. Also, a VT1 sub signal (VT1 sub) is output from the first sub-coil 32; a VT2 main signal (VT2 main) is output from the second main coil 33; and a VT2 sub signal (VT2 sub) is output from the second sub-coil 34. The VT1 main signal, VT1 sub signal, VT2 main signal, and VT2 sub signal are input to a controller ECU. The controller ECU comprises a computer and receives a vehicle speed signal V and the like from a vehicle speed sensor 8 detecting the speed of the vehicle. Also, the controller ECU receives a measured current signal Do obtained by measuring the motor electric current flowing through the brushless motor 4, a motor rotation angle signal "a" obtained by measuring the rotation angle of the rotor of the brushless motor 4, and the like.

The controller ECU outputs a motor current signal D to make the brushless motor 4 operate based on the received VT1 main signal, VT1 sub signal, VT2 main signal, VT2 sub signal, vehicle speed signal V, measured current signal Do, motor rotation angle signal "a", and the like.

The brushless motor 4 outputs the auxiliary torque AH to assist the steering torque Ts according to the motor current signal D, and the auxiliary torque AH is transmitted to the rack shaft 6 via the decelerating device 5, by which it is converted to linear motion. Also, the steering torque Ts generated directly by the driver is transmitted to the rack shaft 6 via the rack-pinion gear 11, by which it is converted to linear motion.

The linear motion from the steering torque Ts transmitted to the rack shaft 6 and the linear motion from the auxiliary torque AH are combined to move the tie rods 14, thereby changing the travel direction of the tires 10. By combining the auxiliary torque AH with the steering torque Ts, the steering torque Ts necessary for the driver to steer can be reduced. The turning angle θ of the steering wheel 2 rotates the travel direction of the tires 10 through α.

For example, for easiness to understand, it is assumed that Ts is the value of the steering torque Ts, AH is the value of the auxiliary torque AH, and a constant kA is a coefficient of the auxiliary torque AH. Then AH=kA×Ts. It is assumed that Tp is pinion torque, which is a load. Then the pinion torque Tp is a sum of steering torque Ts and auxiliary torque AH (Tp=Ts+AH), and hence Ts=Tp/(1+kA). Therefore, the steering torque Ts is 1/(1+kA) times the pinion torque Tp, where kA≦0, and smaller than the pinion torque Tp, thus reducing the steering torque Ts. Although in the above the kA is assumed to be a constant for easiness to understand, the kA preferably decreases as the vehicle speed increases. By this means, even if a load to rotate the tires 10 through α relative to the road surface decreases as the vehicle's traveling speed becomes higher, the steering torque Ts required to rotate the tires 10 through α can be large enough to give a feeling of reaction.

Figure 2:
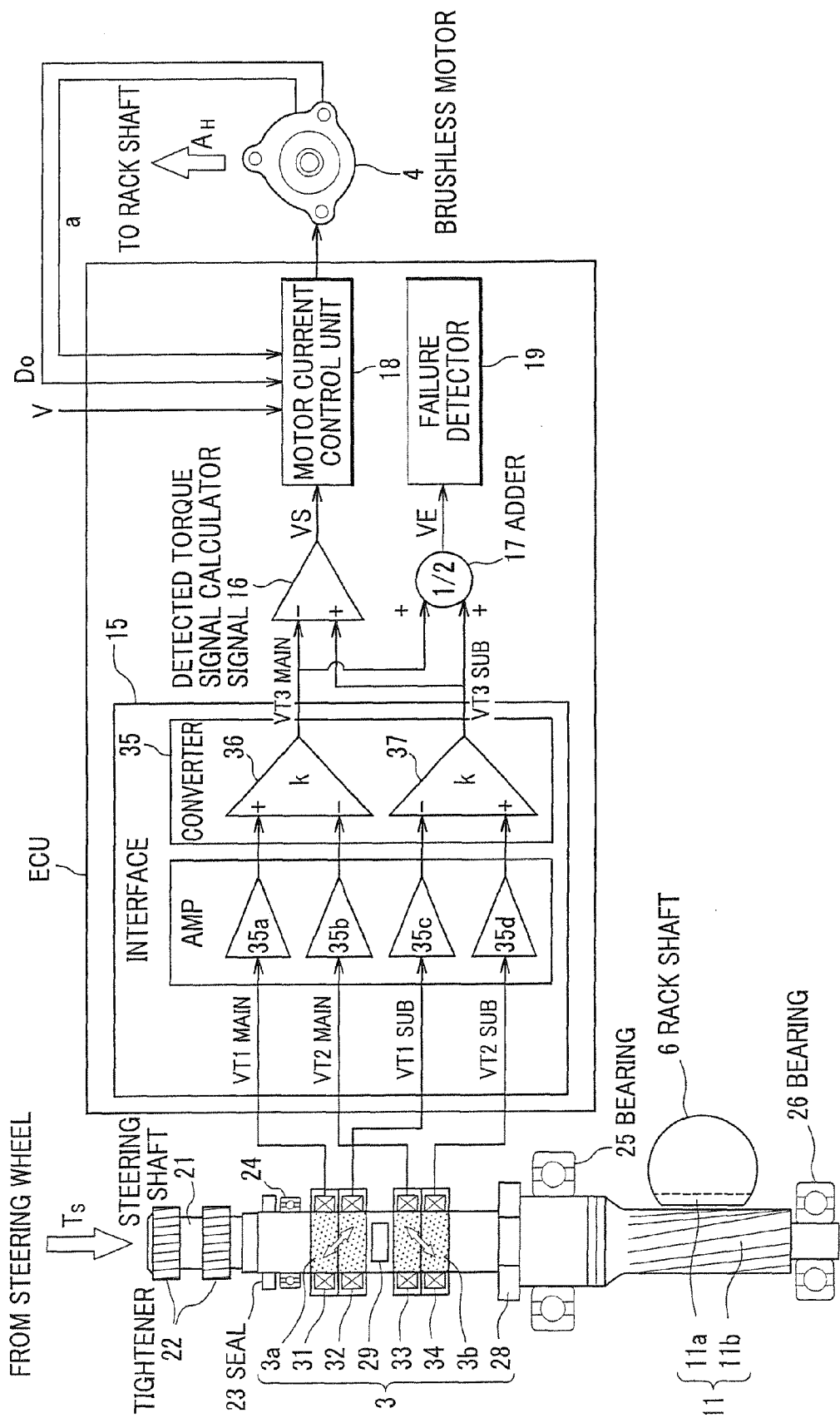
FIG. 2 is a diagram showing the configuration of the magnetostrictive torque sensor and accompanied units in the electric power steering system according to the present embodiment.

FIG. 2 is a block diagram of the magnetostrictive torque sensor 3 and its neighbors in the electric power steering system 1. As shown in FIG. 2, the controller ECU has an interface 15. The interface 15 has a converter 35 and an amplifier circuit AMP. The amplifier AMP has an amplifier 35a for amplifying the VT1 main signal, an amplifier 35b for amplifying the VT2 main signal, an amplifier 35c for amplifying the VT1 sub signal, and an amplifier 35d for amplifying the VT2 sub signal. The converter 35 has a VT3 main calculator (operational amplifier) 36 for calculating a VT3 main signal (VT3 main) and a VT3 sub calculator (operational amplifier) 37 for calculating a VT3 sub signal (VT3 sub). Further, the controller ECU has a detected torque signal calculator (operational amplifier) 16 for calculating a detected torque signal VS from the VT3 main signal and VT3 sub signal and an adder 17 for adding the VT3 sub signal to the VT3 main signal to obtain a failure detection signal VE. Further, the controller ECU has a motor current control unit 18 for outputting a motor current D to make the brushless motor 4 operate based on the detected torque signal VS, vehicle speed signal V, measured current signal Do, and motor rotation angle signal "a", and a failure detector 19 for detecting a failure in the magnetostrictive torque sensor 3.

Figure 3:
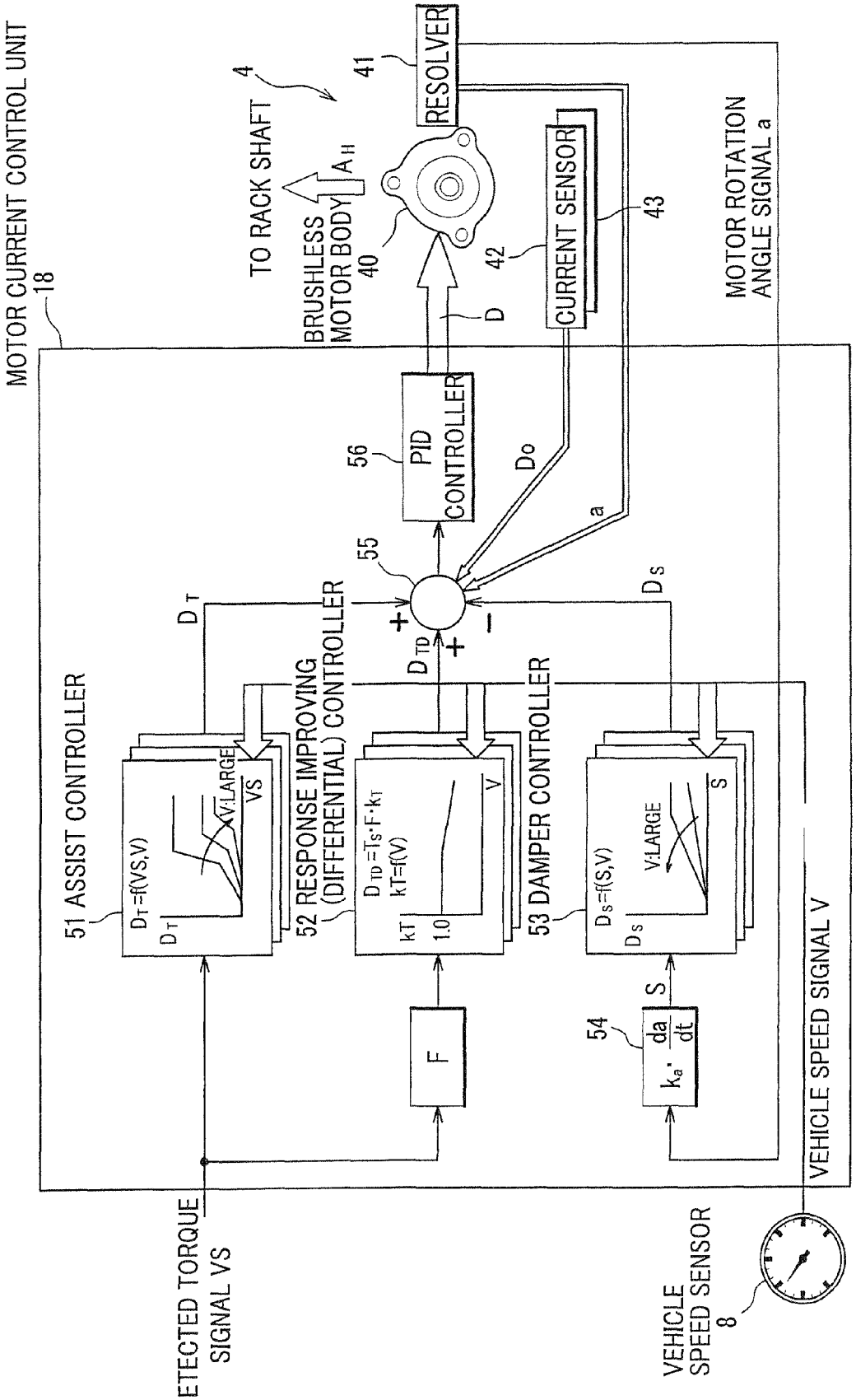
FIG. 3 is a block diagram of a motor current control unit and a brushless motor according to the present embodiment.

FIG. 3 is a block diagram of the motor current control unit 18 and the brushless motor 4. As shown in FIG. 3, the motor current control unit 18 has an assist controller 51, a filter F, a response improving (differential) controller 52, a steering shaft rotation speed calculator 54, a damper controller 53, a three-phase conversion adder-subtractor 55, and a PID controller 56.

The assist controller 51 determines a motor current signal DT to output the auxiliary torque AH based on the detected torque signal VS and vehicle speed signal V. The motor current signal DT needs to be made larger as the detected torque signal VS becomes larger, and conversely be made smaller as the vehicle speed signal V becomes larger. Further, an area where the motor current signal DT is constant exists in the area where the detected torque signal VS is large. Thus, when the vehicle speed signal V becomes larger, a definite feeling of reaction to the steering torque can be given. This corresponds to decreasing the kA as the vehicle speed increases as mentioned above. In order to determine the motor current signal DT, the motor current signal DT is preferably defined as a function f(VS, V) with the detected torque signal VS and vehicle speed signal V as arguments, and the function may be defined as a table not being limited to an equation.

The filter F can improve the response and stability of the brushless motor 4 and specifically calculates a differential value F of the detected torque signal VS. The response improving (differential) controller 52 adjusts a gain kT for the calculated differential value F according to the vehicle speed signal V. The gain kT tends to be decreased as the vehicle speed signal V becomes larger. In order to adjust the gain kT, the gain kT is preferably defined as a function f(V) with the vehicle speed signal V defined as an argument, and the function may be defined as a table not being limited to an equation.

A motor current signal DTD can be obtained by multiplying the detected torque signal VS, the differential value F, and the gain kT (DTD=VS×F×kT).

The steering shaft rotation speed calculator 54 calculates a motor rotation (steering) speed signal S by differentiating the motor rotation angle signal a. The damper controller 53 determines a motor current signal Ds to be subtracted from the motor current signal based on the motor rotation speed signal S and the vehicle speed signal V. The motor current signal Ds tends to be made larger as either of the motor rotation speed signal S and the vehicle speed signal V becomes larger. The three phase converting adder-subtractor 55 subtracts the larger motor current signal Ds as the vehicle speed signal V becomes larger and subtracts the larger motor current signal Ds as the rotation speed of the brushless motor 4, i.e., the motor rotation speed signal S becomes larger, thus producing a damper effect. This improves convergence characteristic of the settling of the steering wheel 2 and thus improves the stability of the vehicle when traveling at high speed. In order to determine the motor current signal Ds, the motor current signal Ds is preferably defined as a function f(S, V) with the motor rotation speed signal S and vehicle speed signal V defined as arguments, and the function may be defined as a table not being limited to an equation.

The three phase converting adder-subtractor 55 adds the motor current signal DT and the motor current signal DTD and subtracts the motor current signal Ds, thereby calculating a target torque current signal. The brushless motor 4 comprises a brushless motor body 40, a resolver 41 and current sensors 42, 43. The resolver 41 detects the motor rotation angle of the rotor of the brushless motor body 40 and transmits the motor rotation angle signal a. The current sensors 42, 43 transmit the measured current signal Do obtained by measuring the motor current flowing through the brushless motor body 40. In the three phase converting adder-subtractor 55, the measured current signal Do having three phases is dq-converted by the motor rotation angle signal "a".

The PID controller 56 outputs a motor current D to the brushless motor body 40 so as to make the dq-converted measured current signal Do coincide with the target torque current signal calculated by the three phase converting adder-subtractor 55.

Figure 4:
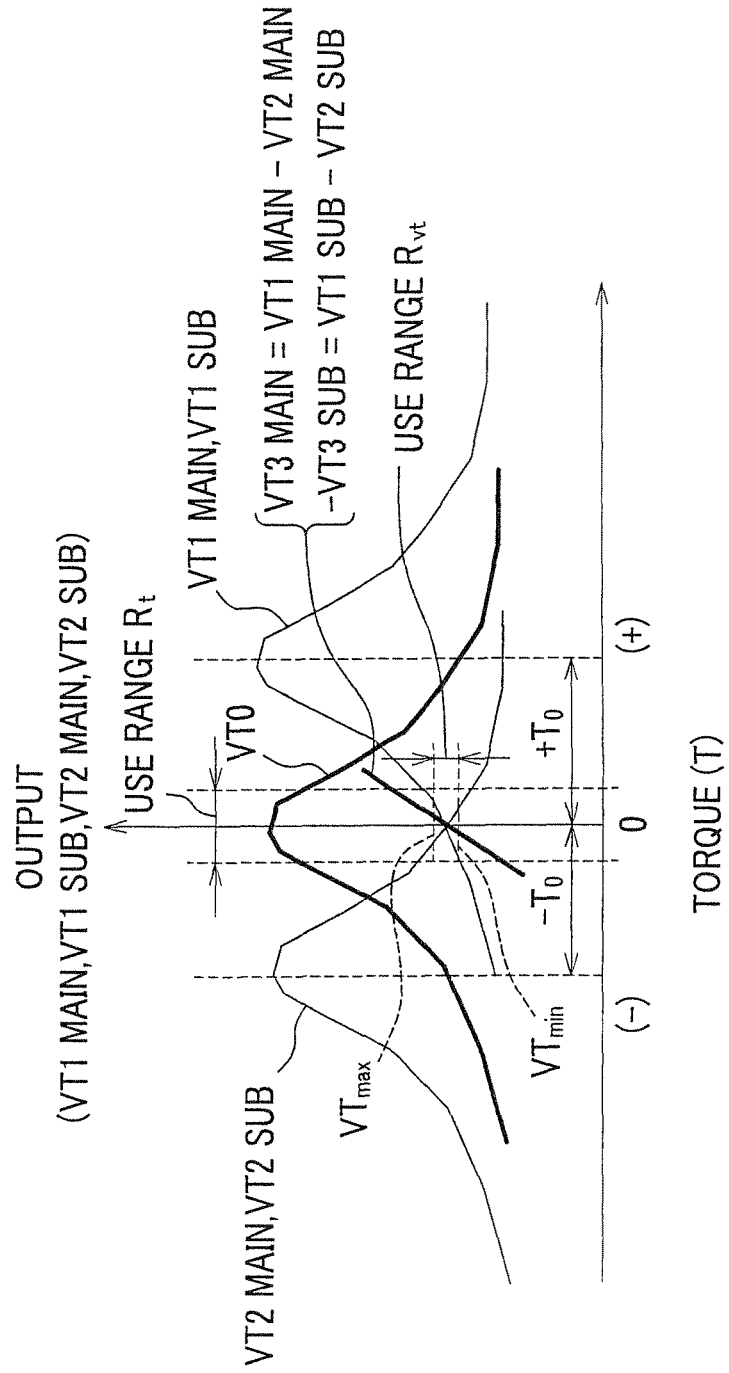
FIG. 4 shows the output characteristics of a first main coil and a first sub coil placed on a first magnetostrictive film and of a second main coil and a second sub coil placed on a second magnetostrictive film.

FIG. 4 shows the output characteristics of the VT1 main signal, VT1 sub signal, VT2 main signal, and VT2 sub signal.

While alternating currents are flowing through the first and second magnetostrictive films 3a, 3b, when torque is applied, variations in permeability that is the magnetostrictive characteristic of the first and second magnetostrictive films 3a, 3b are detected by means of the first main coil 31, the first sub-coil 32, the second main coil 33, and the second sub-coil 34 in the form of the output characteristics f(the VT1 main signal, VT1 sub signal, VT2 main signal, and VT2 sub signal).

The output characteristic VTO produced with the first and second magnetostrictive films 3a, 3b before magnetic anisotropy is given is an output characteristic (e.g., an impedance characteristic) almost symmetric with respect to the acting directions of the torque (rightward turn (+), leftward turn (−)). Then, rightward turn torque +To and leftward turn torque −To that are sufficiently larger than a use range Rt are made to remain in the first and second magnetostrictive films 3a, 3b, thereby giving magnetic anisotropy thereto. The output characteristics of the first magnetostrictive film 3a given magnetic anisotropy by the torque +To are the VT1 main signal and VT1 sub signal, and the output characteristics of the second magnetostrictive film 3b given magnetic anisotropy by the torque −To are the VT2 main signal and VT2 sub signal.

For the use range Rt, an operation expressed as "VT3 main signal=VT1 main signal−VT2 main signal" and an operation expressed as "−VT3 sub signal=VT1 sub signal−VT2 sub signal" are performed in the VT3 main calculator 36 and the VT3 sub calculator 37 (see FIG. 2). These operations enable detecting the acting direction and magnitude of the torque and improve sensitivity (the gradient of the graph in FIG. 4). In order to detect a failure in the magnetostrictive torque sensor 3, the failure detection signal VE is defined as (VT1 main signal+VT2 main signal)/2 or (VT1 sub signal+VT2 sub signal)/2. If normal, they are almost constant. A use range Rvt of an appropriate allowable width with an output maximum VTmax and an output minimum VTmin as upper and lower limits can be set. If the failure detection signal VE is not in between the output maximum VTmax, the upper limit, and the output minimum VTmin, the lower limit, it can be determined that a failure has occurred. The failure detection signal VE is often set at about 2.5 V in terms of voltage.

Figure 5:
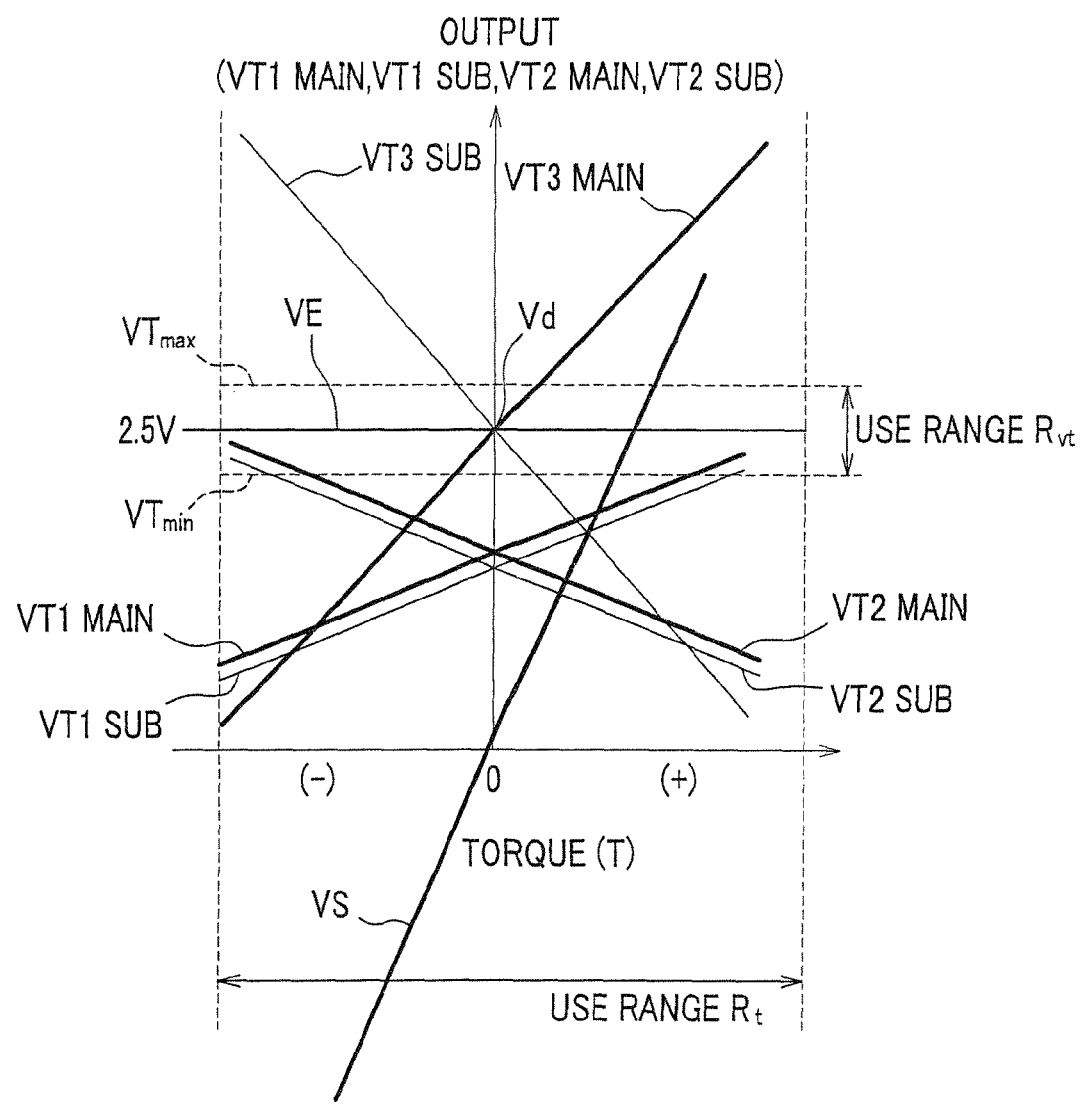
FIG. 5 shows the output characteristics of the first main coil, first sub coil, second main coil and second sub coil, and the output characteristics of a VT3 main signal, a VT3 sub signal, detected torque signal, and failure detection signal that are plotted only over the use range Rt of FIG. 4.

FIG. 5 shows the output characteristics of the VT1 main signal, VT1 sub signal, VT2 main signal, VT2 sub signal, VT3 main signal, VT3 sub signal, the detected torque signal VS, and the failure detection signal VE that are plotted only over the use range Rt. The VT3 main signal is calculated in the VT3 main calculator 36 by subtracting the VT2 main signal from the VT1 main signal and multiplying the subtracted value by a coefficient k (VT3 main signal=k×(VT1 main signal−VT2 main signal)). Further, the VT3 main signal is shifted by the VT3 main calculator 36 so as to be at 2.5 V when the torque is at zero.

The VT3 sub signal is calculated in the VT3 sub calculator 37 by subtracting the VT1 sub signal from the VT2 sub signal and multiplying the subtracted value by a coefficient k (VT3 sub signal=k×(VT2 sub signal−VT1 sub signal)). Further, the VT3 sub signal is shifted by the VT3 sub calculator 37 so as to be at 2.5 V when the torque is at zero.

The detected torque signal VS is calculated in the detected torque signal calculator 16 by subtracting the VT3 sub signal from the VT3 main signal (VS=VT3 main signal−VT3 sub signal). Even if use ambient temperature or the magnetic environment varies and thus the VT1 main signal, VT2 main signal, VT1 sub signal, and VT2 sub signal vary, their variations can be cancelled out because they vary in the same way. When the torque is at zero, both the VT3 main signal and the VT3 sub signal are at 2.5 V. Hence, the detected torque signal VS can also be at zero when the torque is at zero. From the detected torque signal VS, the acting directions of the torque (rightward turn (+), leftward turn (−)) and its magnitude can be detected. Because the detected torque signal VS is large in the gradient of its graph of FIG. 5, the magnitude of the torque can be detected with high sensitivity.

The failure detection signal VE is calculated in the adder 17 by adding the VT3 sub signal to the VT3 main signal and multiplying the added value by ½ (VE=(VT3 main signal+VT3 sub signal)/2). The failure detector 19 determines whether the failure detection signal VE is within the use range Rvt, and if true, determines being normal and if not, determines that a failure has occurred. To be specific, the failure detector 19 determines whether the failure detection signal VE is greater than the output maximum VTmax and if greater, outputs the result indicating the occurrence of a failure and if not, outputs the result indicating being normal. Likewise, the failure detector 19 determines whether the failure detection signal VE is greater than the output minimum VTmin and if greater, outputs the result indicating being normal and if not, outputs the result indicating the occurrence of a failure.

In the above, the structure of the magnetostrictive torque sensor 3 and the mechanism of detecting torque have been described. In the below, on the basis of the above description there will be described the phenomenon that when performing so-called stationary steering, the auxiliary steering force differs in magnitude between the rightward turning and leftward turning of the steering wheel, which poses a problem.

Figure 6A:
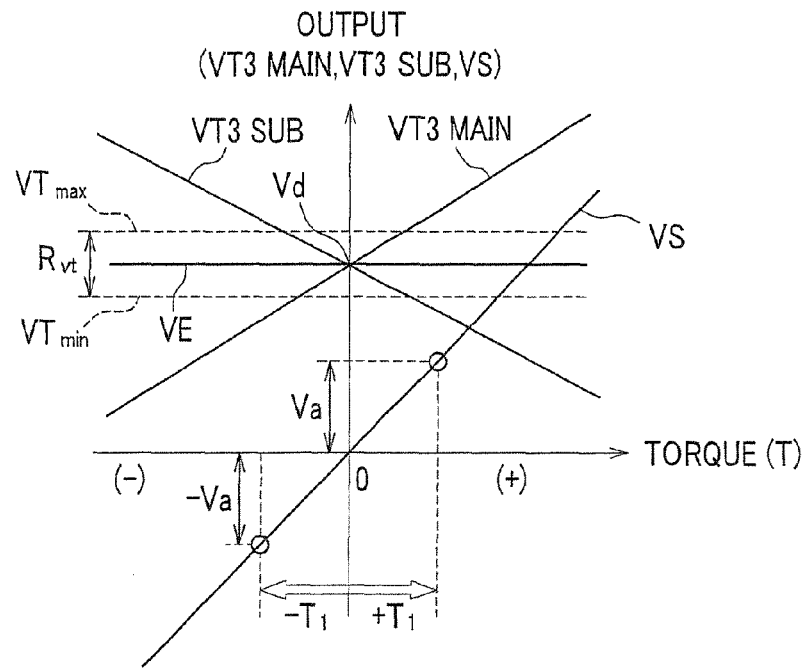
FIG. 6A shows the output characteristics of the magnetostrictive torque sensor before being left at use ambient temperature.

As shown in FIG. 6A, when the magnetostrictive torque sensor 3 is placed in the atmosphere of, e.g., 20° C. in temperature, which is not subject to the use ambient temperature, because initially steering torque is not applied, the torque is at zero and the VT3 main signal and the VT3 sub signal intersect at the middle point Vd of the use range Rvt. Hence, the detected torque signal VS passes through the origin. Here, it is assumed that an output value Va is obtained when torque +T1 is applied. Then, if torque −T1 of the same magnitude in the direction opposite to that of the torque +T1 is applied, an output value −Va of the same magnitude in the direction opposite to that of the output value Va can be obtained. Further, the value of the failure detection signal VE is equal to the middle point Vd and hence within the use range Rvt.

Figure 6B:
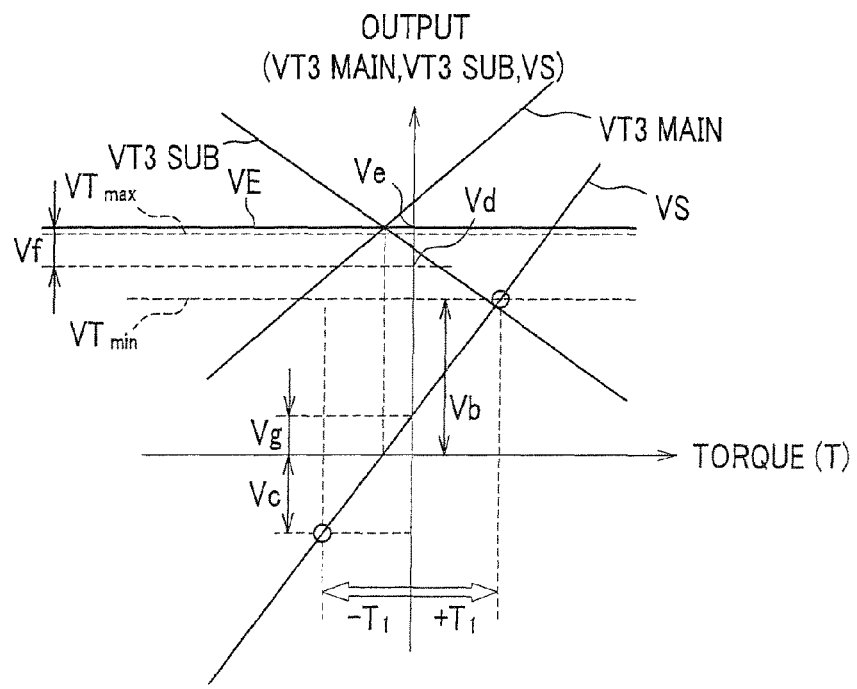
FIG. 6B shows the output characteristics of the magnetostrictive torque sensor after being left at use ambient temperature.

Here, it is assumed that as shown in FIG. 6B, after the magnetostrictive torque sensor 3 is subjected to the use ambient temperature or left in the atmosphere of, e.g., 110° C. in temperature for about 400 hours, for example, the VT3 main signal has drifted to a greater degree than the VT3 sub signal. Then, the output value Ve at the intersection of the VT3 main signal and the VT3 sub signal becomes higher by Vf than the middle point Vd and higher than VTmax. Also, the value of the failure detection signal VE becomes the same as the output value Ve and hence is not within the use range Rvt. Thus, a failure is detected. When the torque is at zero, the detected torque signal VS does not pass through the origin, and thus an output value Vg is output. Although the torque −T1 of the same magnitude in the direction opposite to that of the torque +T1 is applied because application of the torque +T1 provides an output value Vb, an output value of the same magnitude in the direction opposite to that of the output value Vb is not obtained, but an output value Vc of different magnitude is obtained. This difference causes the phenomenon that the auxiliary steering force differs in magnitude between the rightward turning and leftward turning of the steering wheel.

The detected torque signal VS is output at the output value Vg even when the torque is at zero. Hence, when steering torque is not applied, that is, when not turning the steering wheel, the detected torque signal VS is at the output value Vg, and hence the motor current D set by the motor current control unit 18 is expected to flow through the brushless motor 4.

Since the drifts of the VT3 main signal and of the VT3 sub signal are caused by the drift of the VT1 main signal, VT1 sub signal, VT2 main signal, and VT2 sub signal, the drifts are thought to be caused by some change in the quality of the first and second magnetostrictive films $3a$, $3b$ at the use ambient temperature.

Figure 7:
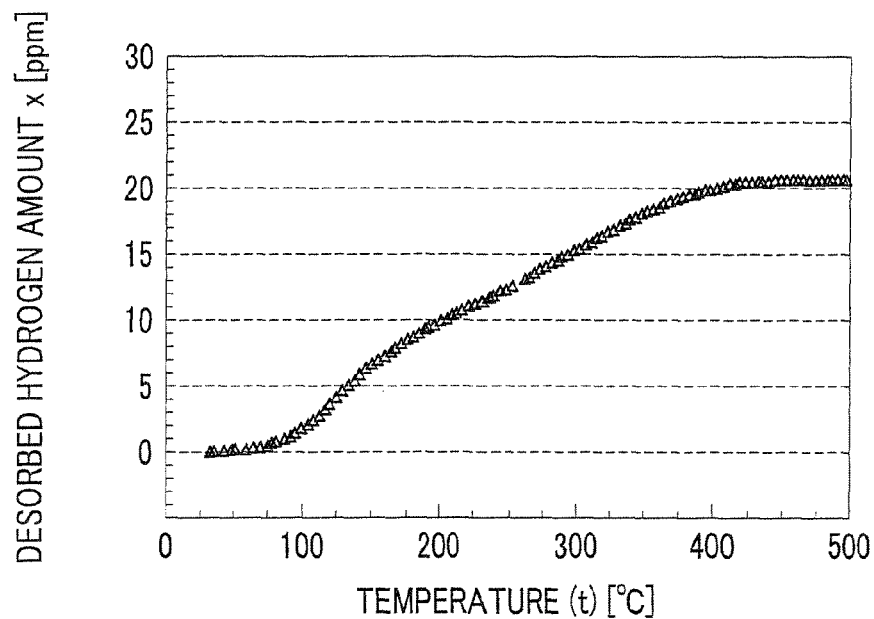
FIG. 7 shows a temperature profile of the amount of hydrogen desorbed from the first magnetostrictive film before heat treatment measured according to thermal desorption gas analysis.

Accordingly, as to the first and second magnetostrictive films $3a$, $3b$, the hydrogen amount in samples was measured according to thermal desorption gas analysis (TDS). First, the first and second magnetostrictive films $3a$, $3b$ of, e.g., Ni—35% Fe in composition and of 40 μm in thickness were formed on the steering shaft 21 by, e.g., electroplating, and thereafter the first and second magnetostrictive films $3a$, $3b$ were removed mechanically from the steering shaft 21. The removed first and second magnetostrictive films $3a$, $3b$ were cut into parts of about 30 mm² in surface area to make samples. The thicknesses of the removed first and second magnetostrictive films $3a$, $3b$ were the same 40 μm as that after the formation. Next, the samples were put in a glass-made ampoule, which was evacuated and heated to 500° C. at a rise rate of 5° C. per minute. Pressure variation in the ampoule being heated was measured with a Pirani gage, and the number of moles of hydrogen desorbed from the samples was obtained. Further, the ratio x of the weight of desorbed hydrogen gas to the weight of the samples (a desorbed hydrogen amount) was calculated. The results of the calculation are shown in FIG. 7. The horizontal axis represents the sample temperature t when heating the samples at the rise rate of 5° C. per minute, and the vertical axis represents the desorbed hydrogen amount x. It was found that the desorbing rate of hydrogen rises rapidly around 100° C. and desorbing continues until around 400° C. Further, it was confirmed with a mass spectrometer that all of desorbed gas due to heating up to 500° C. was hydrogen ($H_2$).

Figure 8:
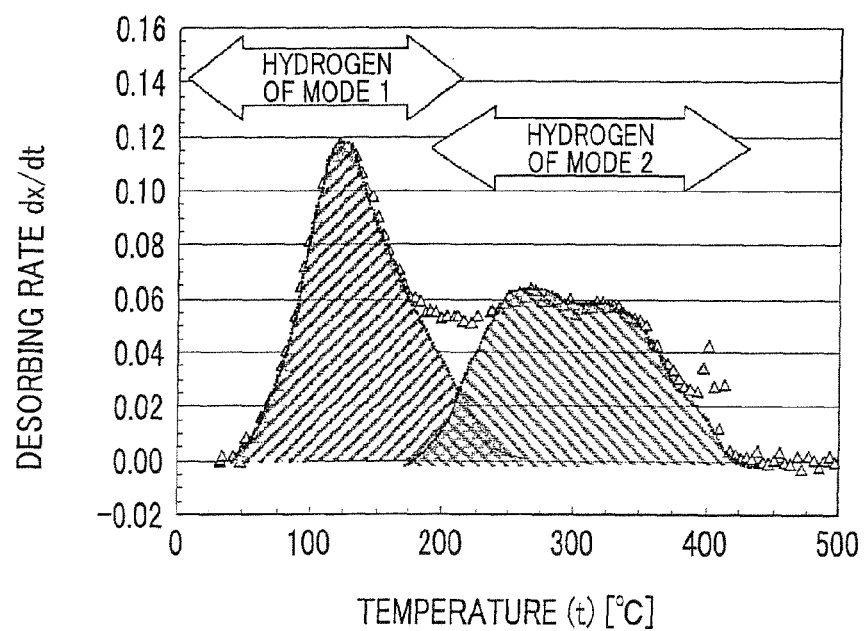
FIG. 8 shows a temperature profile of the desorption rate of hydrogen desorbed from the first magnetostrictive film before heat treatment measured according to thermal desorption gas analysis.

Next, as shown in FIG. 8, by differentiating the desorbed hydrogen amount x with respect to the sample temperature t, the desorbing rate (dx/dt) was calculated. It is thought that the profile of the desorbing rate has the distribution for hydrogen of mode 1 having its peak around 120° C. and that for hydrogen of mode 2 having peaks over a wide range of 250 to 350° C. overlapping. There is a sharp peak around 400° C., which is thought to indicate hydrogen desorbed due to phase change or thermal decomposition because the peak did change through heat treatment at temperatures below the peak's temperature. The hydrogen of mode 1 is thought to be the main cause for the change in state of the magnetostrictive films because the desorbed hydrogen amount decreases and the peak's temperature shifts toward the high temperature side as time elapses from the plating. In order to accelerate the desorbing of the hydrogen of mode 1 to stabilize the magnetostrictive films, the magnetostrictive films need to be heat treated at as high temperature as possible without damaging the characteristics of the magnetostrictive films and their base material, which temperature is preferably set at annealing temperature for material for structure. If heat treated at low temperature, heat treatment time needs to be extended. For use in a high temperature environment such as the engine, the hydrogen of mode 2 that is desorbed at even higher temperature is also preferably stabilized, and the magnetostrictive films may be heat treated at 250° C. or above.

Thus, if the heat treatment step comprises a plurality of heat treatments different in the heat treatment temperature or heat treatments of which the heat treatment time is divided into, the heat treatments may have peak temperatures of substantially 120° C. and 400° C., respectively.

Figure 9A:
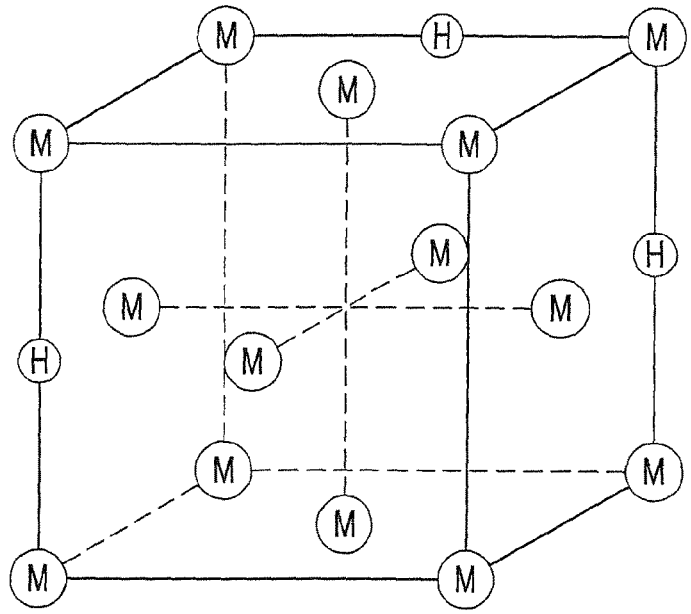
FIG. 9A shows the distribution of hydrogen atoms related to the desorption of hydrogen of mode 1 in FIG. 8 in a unit lattice of the first magnetostrictive film.

FIG. 9A shows a state where the hydrogen of mode 1 is contained in the first or second magnetostrictive film 3*a*, 3*b*. Hydrogen atoms H exist by solution between lattice points (or in spaces) of metal atoms M forming the first or second magnetostrictive film 3*a*, 3*b*. The activation energy for this hydrogen atom to move is so small as to move away at about room temperature. Therefore, hydrogen outgases in diffusion from the first and second magnetostrictive films 3*a*, 3*b* even in the market environment.

Figure 9B:
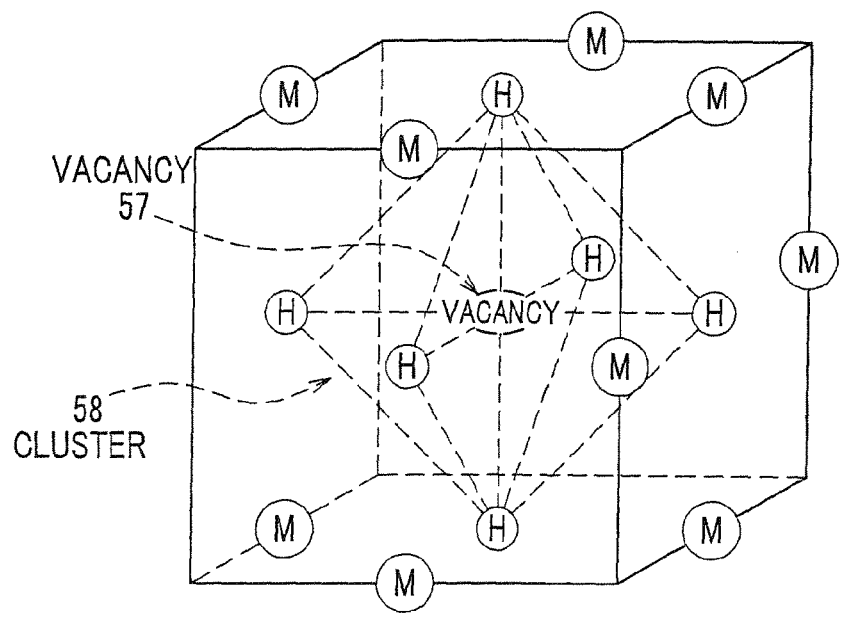
FIG. 9B shows the distribution of hydrogen atoms related to the desorption of hydrogen of mode 2 in a unit lattice of the first magnetostrictive film.

FIG. 9B shows a state where the hydrogen of mode 2 is contained in the first or second magnetostrictive film 3*a*, 3*b*. A large amount of hydrogen that is generated in forming the films causes the generation of vacancies, and forms vacancy-hydrogen clusters to be in a metastable state, which is higher in binding energy than in the case of existing by solution between the lattice points, and hence hydrogen movement (diffusion) occurs at higher temperature. It was found that hydrogen outgassing from the vacancy-hydrogen clusters rapidly increases in a temperature range of 200° C. or above.

Due to the diffusive movement of hydrogen atoms H of modes 1 and 2, changes in internal stress occur in the first and second magnetostrictive films 3*a*, 3*b*, thus changing their magnetostrictive characteristic. Further, as to the mode 2, it is thought that an excess of vacancies 57 exist, hence facilitating the diffusive movement of metal atoms M such as nickel (Ni) atoms and iron (Fe) atoms and that also by this diffusive movement, internal stress changes thus changing the magnetostrictive characteristic.

Hence, in order not to let the magnetostrictive characteristic change, it is thought that hydrogen atoms H and vacancies 57 need to be prevented from diffusively moving. Accordingly, in order to prevent hydrogen atoms H and vacancies 57 from diffusively moving at use ambient temperature, hydrogen atoms H and vacancies 57 in the first and second magnetostrictive films 3*a*, 3*b* need to be reduced in number, and particularly hydrogen atoms H need to be desorbed from the first and second magnetostrictive films 3*a*, 3*b*. Accordingly, in the vehicle production process, the first and second magnetostrictive films 3*a*, 3*b* are heat-treated in order that hydrogen is desorbed from the first and second magnetostrictive films 3*a*, 3*b*, which reduces the concentration of hydrogen in the first and second magnetostrictive films 3*a*, 3*b*.

In the below, the heat treatment process for the first and second magnetostrictive films 3*a*, 3*b* will be described.

Figure 10:
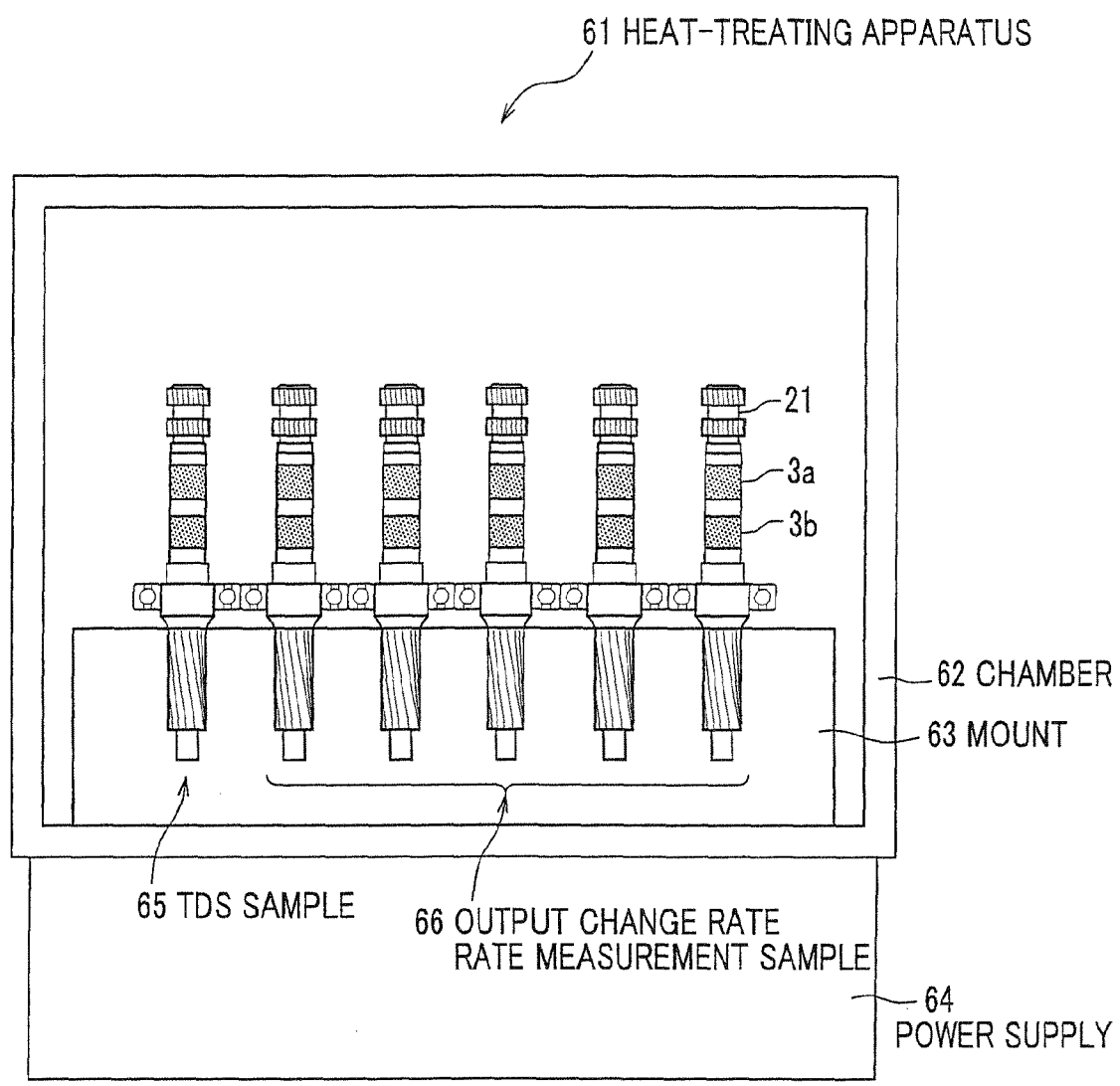
FIG. 10 is a front view of a heat-treating apparatus according to the present embodiment.

FIG. 10 shows a heat-treating apparatus 61 used in the heat treatment process. A plurality of the steering shafts 21 having the first and second magnetostrictive films 3*a*, 3*b* formed thereon are put in the heat-treating apparatus 61 and can be heated under the same conditions at the same time. The steering shafts 21 are put in a chamber 62 and are inserted into a mount 63 placed in the chamber 62 so as to stand upright. Then, the first and second magnetostrictive films 3*a*, 3*b* are heated using a power supply 64. One of the steering shafts 21 is used as a TDS sample 65 for TDS measurement to evaluate how much hydrogen that can be desorbed is contained in the first and second magnetostrictive films 3*a*, 3*b*. The other steering shafts 21 are evaluated in terms of how much the magnetostrictive characteristic changes at use ambient temperature.

The first and second magnetostrictive films 3*a*, 3*b* need to be given magnetic anisotropy. As the method of giving magnetic anisotropy there is a method in which the creep characteristic of the first and second magnetostrictive films 3*a*, 3*b* themselves is used. Torques of the same magnitude in opposite rotational directions are applied respectively to the first and second magnetostrictive films 3*a*, 3*b* at the same time, the first and second magnetostrictive films 3*a*, 3*b* are heated to about 300 to 400° C. Then, after the first and second magnetostrictive films 3*a*, 3*b* are left at room temperature to be cooled, the application of the torques is stopped.

When bonded to the steering shaft 21, the first and second magnetostrictive films 3*a*, 3*b* are bonded onto the steering shaft 21 to which torques of the same magnitude in opposite rotational directions are being applied simultaneously, and then the only stopping application of the torques can complete the process. As such, in methods of giving magnetic anisotropy, the first and second magnetostrictive films 3*a*, 3*b* need not necessarily be heated.

However, the method of giving magnetic anisotropy, where heated, functions also as the heat treatment process, and hence with giving magnetic anisotropy, hydrogen can be desorbed to reduce the amount of residual hydrogen.

A method of giving magnetic anisotropy will be described in detail below using FIGS. 11A and 11B.

Figure 11:
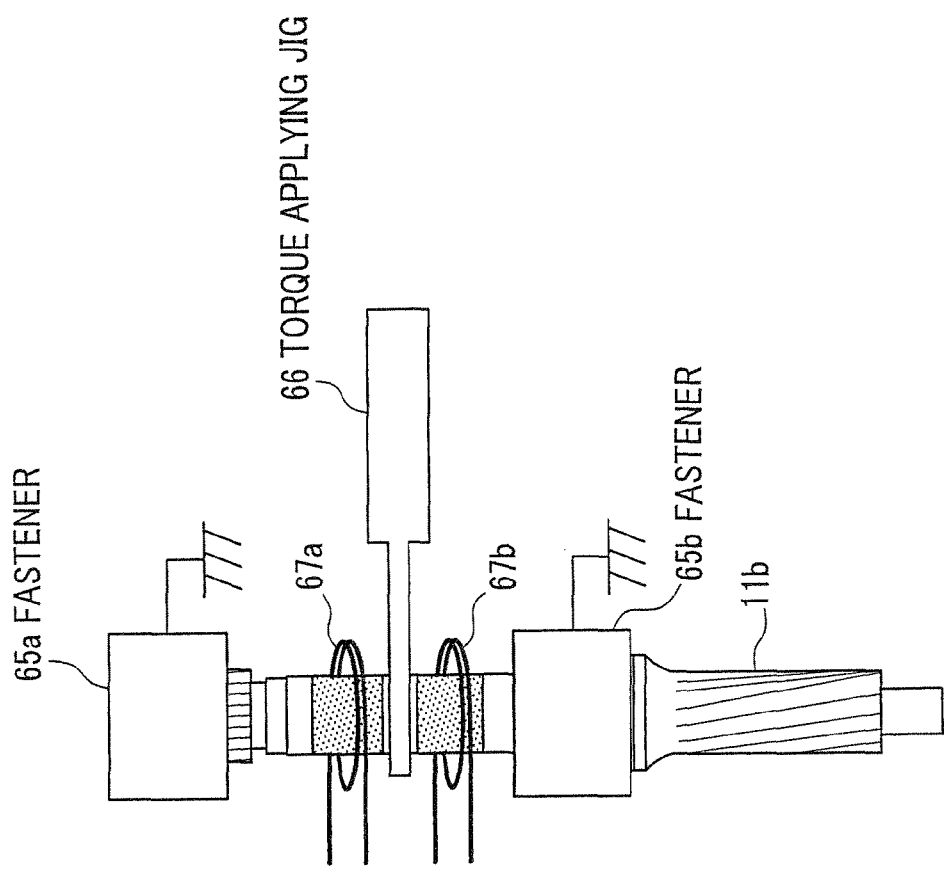
FIG. 11A is a side view of a steering shaft.
FIG. 11B is a side view of the steering shaft placed in the heat-treating apparatus.

First, as shown in FIG. 11B, high frequency coils 67*a* and 67*b* through which alternating currents of high frequency flow are wound respectively around the first and second magnetostrictive films 3*a*, 3*b* on the steering shaft 21. The tightener 22 shown in FIG. 11A is attached and fixed to a fastener 65a, and the fixing portion 28 is attached and fixed to a fastener 65b. A torque applying jig 66 is made to engage a flat surface 29 provided between the first and second magnetostrictive films 3a, 3b to be fixed to the steering shaft 21 so as to twist the steering shaft 21, thereby applying torque thereto. The magnitude of the applied torque corresponds to that of torque +To of FIG. 4 and is preferably 1.5 or greater times the upper limit of the use range Rt. To be specific, torque of about 15 to 100 Nm in magnitude is applied. By this torque acting on the steering shaft 21, torques in opposite directions act on the first and second magnetostrictive films 3a, 3b. While applying torque, alternating currents of high frequency are made to flow through the high frequency coils 67a and 67b simultaneously for about 1 to 10 sec. By this energizing, the first and second magnetostrictive films 3a, 3b are heated to creep, and thus the torques in opposite directions are released. The advantage of this high frequency heating (HFH) is that while the first and second magnetostrictive films 3a, 3b are heated, the steering shaft 21 is hardly heated. Hence, while in the heat treatment the temperature of the first and second magnetostrictive films 3a, 3b rises to, e.g., 400° C. by the high frequency heating, the steering shaft 21 is not heated and hence is not subject to the creep or transition in crystal structure. Further, it is thought that this high frequency heating can also function as the heat treatment process for reducing the concentration of hydrogen in the first and second magnetostrictive films 3a, 3b.

Finally, with the torque being applied, the temperature of the first and second magnetostrictive films 3a, 3b is lowered to room temperature. The torque applying jig 66 is detached from the flat surface 29 to stop applying the torque from the torque applying jig 66 acting on the steering shaft 21. By this, torques in opposite directions from the steering shaft 21 act on the first and second magnetostrictive films 3a, 3b, thereby giving so-called magnetic anisotropy thereto.

In this way, the heat treatment process was performed by the high frequency heating (HFH), and the TDS sample 65 and output change rate measurement samples 66 were obtained. The heat treatment conditions in high frequency heating were the heat treatment temperature of 400° C. and the heat treatment time of 1 sec to 10 sec for the first and second magnetostrictive films 3a, 3b.

Figure 12:
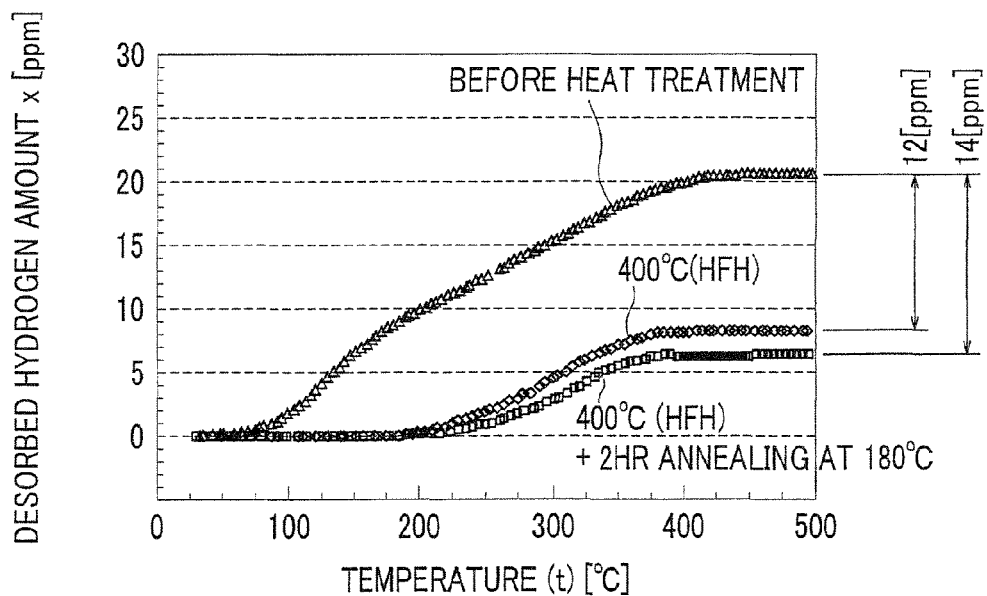
FIG. 12 shows a temperature profile of the amount of hydrogen desorbed from the first magnetostrictive film after heat treatment measured according to thermal desorption gas analysis.

The measurement according to the thermal desorption gas analysis was performed on the TDS sample 65, which resulted in the graphs of FIG. 12. The measurement was conducted using the same procedure as described referring to FIG. 7. In FIG. 12, the spectrum labeled "400° C. (HFH)" is a spectrum of the first and second magnetostrictive films 3a, 3b after the heat treatment process by the high frequency heating (HFH). The spectrum labeled "before heat treatment" is a spectrum of the first and second magnetostrictive films 3a, 3b before the heat treatment process and corresponds to the spectrum of FIG. 7.

In FIG. 12, the spectrum labeled "400° C. (HFH)+2 hr annealing at 180° C." indicates the case where two stages of heat treatment processes were performed. The first stage is a heat treatment process by the high frequency heating (HFH) for also giving magnetic anisotropy, and the subsequent second stage of a heat treatment process is annealing of 180° C. in heat treatment temperature and two hours in heat treatment time using the heat-treating apparatus 61.

The measurement according to the thermal desorption gas analysis shows that the heat treatment process by the high frequency heating reduced the desorbed hydrogen amount, when heated from room temperature to 500° C., by 12 ppm as compared with the case of not performing heat treatment. Adding the annealing further reduced the desorbed hydrogen amount, resulting in the 14 ppm reduction as compared with the case of not performing heat treatment.

As seen from this, even if the heat treatment process is in the form of a plurality of heat treatments that differ in heat treatment temperature or heat treatments of which heat treatment time is divided into such as the magnetic anisotropy giving process and the annealing process, in each stage of a heat treatment, the amount of hydrogen can be reduced. Hence, the heat treatment whose primary objective is not to reduce the amount of hydrogen can also be used as a stage of a heat treatment for reducing the amount of hydrogen.

Moreover, since performing the heat treatment process can reduce the desorbed hydrogen amount as compared with the case of not performing heat treatment, hydrogen is desorbed from the first and second magnetostrictive films 3a, 3b in the heat treatment process. Thus, the amount of hydrogen contained in the first and second magnetostrictive films 3a, 3b is reduced. Hence, in the measurement according to the thermal desorption gas analysis, the amount x of desorbed hydrogen is reduced. Therefore, it is thought that although the heat-treated first and second magnetostrictive films 3a, 3b are placed at use ambient temperature, the amount x of desorbed hydrogen is reduced as in the measurement according to the thermal desorption gas analysis. Since the amount x of desorbed hydrogen at use ambient temperature is reduced, the occurrence of the diffusive movement of hydrogen decreases inside the first and second magnetostrictive films 3a, 3b, and hence internal stress hardly varies. Thus, the magnetostrictive characteristic is expected to hardly vary.

Figure 13:
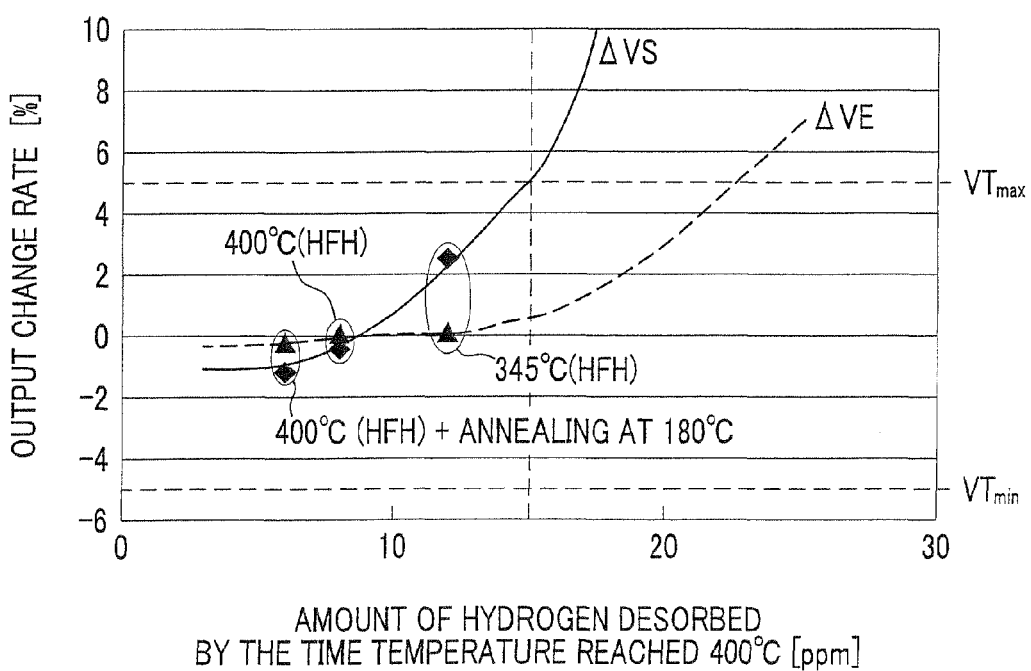
FIG. 13 is a chart of the change rates of the gradient (sensitivity) and middle point of the detected torque signal before and after being left at use ambient temperature against the desorbed hydrogen amount for 400° C. when heated to 400° C. in thermal desorption gas analysis.

In order to confirm this, output change rates were measured using the output change rate measurement samples 66 of FIG. 10 as shown in FIG. 13. The output change rates measured were the change rate of the gradient (sensitivity) of the detected torque signal VS graph in FIG. 5, a so-called sensitivity change rate $\Delta VS$, and the change rate of the output value (middle point) of the failure detection signal VE graph in FIG. 5, a so-called middle point change rate $\Delta VE$.

In the measurement, first, the output change rate measurement samples 66 were assembled in the electric power steering system 1 of FIG. 1, and the initial sensitivity and middle point were measured. Thereafter, the output change rate measurement samples 66 were left at a use ambient temperature of 110° C. for 400 hours. Then, the output change rate measurement samples 66 were assembled in the electric power steering system 1 again, and the sensitivity and middle point after being left at the use ambient temperature were measured. By dividing the difference that is the sensitivity after being left at the use ambient temperature minus the initial sensitivity by the initial sensitivity, the sensitivity change rate $\Delta VS$ was calculated. Likewise, by dividing the difference that is the middle point after being left at the use ambient temperature minus the initial middle point by the initial middle point, the middle point change rate $\Delta VE$ was calculated.

The output change rate measurement samples 66 and the TDS samples 65 on which three different types of heat treatments had been performed were prepared. A first type is the one labeled "400° C. (HFH)" in FIG. 13 and had been heat treated under the same conditions as with "400° C. (HFH)" in FIG. 12. A second type is the one labeled "400° C. (HFH)+annealing at 180° C." in FIG. 13 and had been heat treated under the same conditions as with "400° C. (HFH)+2 hr annealing at 180° C." in FIG. 12. A third type is the one labeled "345° C. (HFH)" in FIG. 13 and had been heat treated under the same conditions as with "400° C. (HFH)" in FIG. 12 except that heat treatment temperature is 345° C.

The horizontal axis of FIG. 13 represents the amount x of hydrogen desorbed by the time analysis temperature reached 400° C. when the measurement according to the thermal desorption gas analysis was performed on the three types of TDS samples 65. The vertical axis represents the sensitivity and middle point change rates calculated from the measurements of the three types of output change rate measurement samples 66. The use range of −5% to 5% of the output change rate can be thought to correspond to the use range Rvt of FIG. 5. If the output change rate is outside the use range of −5% to 5%, the failure detector 19 determines that a failure has occurred, or the driver will feel unease when turning the steering wheel. Therefore, the heat treatment process needs to be such that the output change rate is within the use range of −5% to 5%. Any of those three types of heat treatment processes satisfied that the output change rate is within the use range of −5% to 5%. From the results of the three types of heat treatment processes, it was found that there is a trend that as the amount x of hydrogen desorbed by the time analysis temperature reaches 400° C. increases, the sensitivity and middle point change rates also increase.

This trend shows that the more hydrogen is desorbed from the first and second magnetostrictive films 3a, 3b by the heat treatment process, the smaller amount x of hydrogen is desorbed at use ambient temperature, and hence the occurrence of the diffusive movement of hydrogen decreases inside the first and second magnetostrictive films 3a, 3b, and internal stress and thus the magnetostrictive characteristic hardly varies.

Thus, where the sensitivity change rate ΔVS is used as the output change rate, if the amount x of hydrogen desorbed by the time temperature reaches 500° C. is at or below 15 ppm, it is satisfied that the output change rate is within the use range of −5% to 5%. Where the middle point change rate ΔVE is used as the output change rate, if the amount x of hydrogen desorbed by the time temperature reaches 500° C. is at or below 27 ppm, it is satisfied that the output change rate is within the use range of −5% to 5%.

Figure 14:
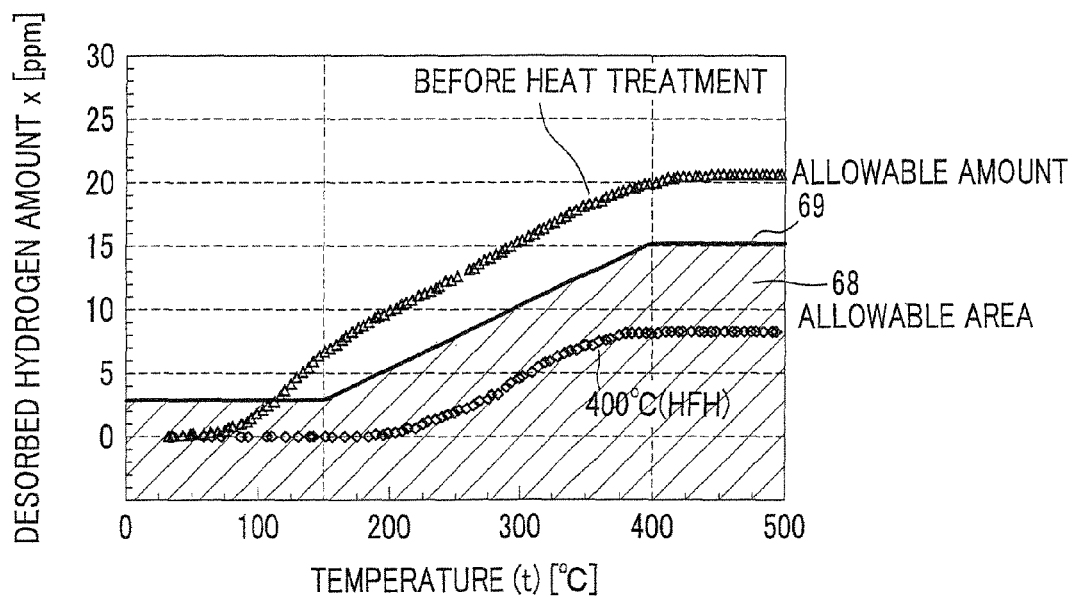
FIG. 14 shows an allowable area through which a temperature profile that the first magnetostrictive film should satisfy in thermal desorption gas analysis passes.

In FIG. 14, the spectrum labeled "before heat treatment" and the spectrum labeled "400° C. (HFH)" of FIG. 12 are shown again. A spectrum estimated from these two spectra where the amount x of hydrogen desorbed by the time analysis temperature reaches 400° C. is at 15 ppm is indicated by an allowable amount 69. That is, as to the spectrum where the amount x of hydrogen desorbed by the time analysis temperature reaches 400° C. is at 15 ppm, the amount x of hydrogen desorbed by the time analysis temperature reaches 300° C. is expected to be 10 ppm, and the amount x of hydrogen desorbed by the time analysis temperature reaches 150° C. is expected to be 3 ppm.

Conversely, if the amount x of hydrogen desorbed by the time analysis temperature reaches 300° C. is at or below 10 ppm, it is expected to be satisfied that the sensitivity change rate is within the use range of −5% to 5%. Likewise, if the amount x of hydrogen desorbed by the time analysis temperature reaches 150° C. is at or below 3 ppm, it is expected to be satisfied that the sensitivity change rate is within the use range of −5% to 5. From the above, an allowable area 68 through which spectra are allowed to pass can be set.

Figure 15:
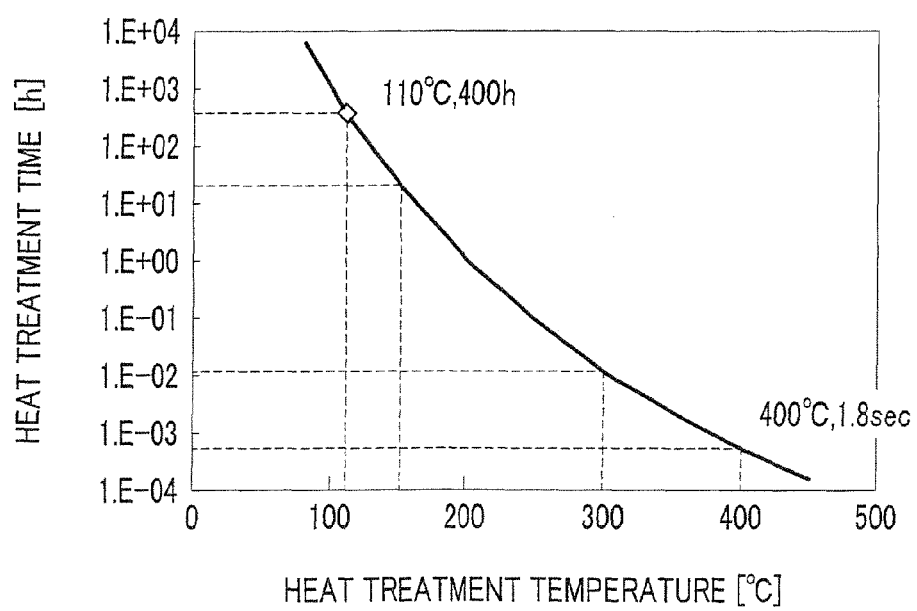
FIG. 15 is a chart showing a relationship between heat treatment temperature and heat treatment time when the desorbed hydrogen amount is the same.

FIG. 15 shows a relationship between the heat treatment temperature and the heat treatment time when the desorbed hydrogen amount x is the same. This desorbed hydrogen amount x is the amount that occurs in the case where the heat treatment temperature is at the use ambient temperature of 110° C. and where the heat treatment time is 400 hours, which causes the driver to realize that the auxiliary steering force differs in magnitude between the rightward turning and leftward turning of the steering wheel when performing stationary steering. The relationship between the heat treatment temperature and the heat treatment time was obtained by simulation from the activation energy and diffusion coefficient of the diffusive movement of vacancies (like vacancy 57 in FIG. 9) in nickel of the same crystal structure, which is the main component of the first and second magnetostrictive films 3a, 3b. Thus, it was found that the necessary heat treatment time is only 1.8 sec at the heat treatment temperature of 400° C. This result is consistent with the result shown in FIG. 13 where it is satisfied that the sensitivity and middle point change rates are within the use range of −5% to 5%, with the high frequency heating (HFH) of 400° C. in the heat treatment temperature and about 1 to 10 sec in the heat treatment time.

Further, from FIG. 15 it is expected to be satisfied that the sensitivity and middle point change rates are within the use range of −5% to 5% with the heat treatment temperature of 150° C. and the heat treatment time of 20 hours. Likewise, it is expected to be satisfied that the sensitivity and middle point change rates are within the use range of −5% to 5% with the heat treatment temperature of 300° C. and the heat treatment time of 36 sec ($10^{-2}$ hr).

Therefore, the heat treatment temperature and the heat treatment time of the heat treatment process can be set according to the type of heat-treating apparatus 61. For example, if a low-temperature thermostatic bath whose heat treatment temperature cannot be set at a high temperature is used as the heat-treating apparatus 61, the heat treatment time may be set according to the low heat treatment temperature of the thermostatic bath. If a hardening or annealing apparatus whose heat treatment temperature is set at a high temperature is used as the heat-treating apparatus 61, the heat treatment time may be set according to the high heat treatment temperature. As such, degrees of freedom in selecting the heat-treating apparatus 61 can be increased in number.

Moreover, the condition setting process of setting the heat treatment temperature and the heat treatment time based on the relationship between the heat treatment temperature and the heat treatment time of FIG. 15 may be performed before the heat treatment process. In the condition setting process, the heat treatment time required to reduce the amount of hydrogen in the first and second magnetostrictive films 3a, 3b can be set according to the heat treatment temperature. Conversely, the heat treatment temperature required to reduce the amount of hydrogen in the first and second magnetostrictive films 3a, 3b can be set according to the heat treatment time.

As described above, as to vehicles, life worth of variation over time that takes 400 hours can be accelerated with the heat treatment process of a short time, and thereafter the rate of variation over time can be suppressed. Therefore, there is provided a magnetostrictive torque sensor where even at the use ambient temperature the magnitude of the detected steering torque signal does not shift and is the same between when turning the steering wheel rightward and when turning it leftward with the same steering effort.

What is claimed is:
1. A production method for a magnetostrictive torque sensor which detects steering torque applied to a steering shaft by electrically detecting distortion of a magnetostrictive film on a surface of the steering shaft, comprising:
    a plating step of forming the magnetostrictive film on the surface of the steering shaft; and
    a heat treatment step of heat treating the magnetostrictive film on the surface of the steering shaft;
    wherein the heat treatment step includes a heat treatment process for decreasing hydrogen included in the magnetostrictive film so that a hydrogen desorbing peak around

120° C. from the magnetostrictive film disappears when the magnetostrictive film is heated after the heat treatment step.

2. The production method for the magnetostrictive torque sensor according to claim 1, wherein the magnetostrictive film is produced by the heat treatment step in which the magnetostrictive film is heated up to 400° C. for between 1 and 10 seconds.

3. The production method for the magnetostrictive torque sensor according to claim 1, wherein the heat treatment step includes a heat treatment process performed by high frequency heating and an annealing process performed for the steering shaft after the heat treatment process.

* * * * *